UNITED STATES PATENT OFFICE.

ALBERT S. FLEXER, OF VIENNA, AUSTRIA-HUNGARY.

MANUFACTURE OF NITRO PRODUCTS FROM PETROLEUM AND TAR.

1,099,976.  Specification of Letters Patent.  Patented June 16, 1914.

No Drawing.  Application filed July 21, 1913.  Serial No. 780,161.

*To all whom it may concern:*

Be it known that I, ALBERT S. FLEXER, manufacturer, a subject of the Austro-Hungarian Emperor, and resident of Vienna, Austria-Hungary, have invented certain new and useful Improvements in or Relating to the Manufacture of Nitro Products from Petroleum and Tar, of which the following is a specification.

The manufacture of nitro products from crude petroleum or from petroleum distillates is already known. It has, however, hitherto been impossible to produce nitro products from pure petroleum which in the trade is generally known as lamp oil or petroleum for lighting purposes. Now it has been found that this is rendered possible if pure petroleum is nitrated in the presence of tar, and a preferable manner of effecting this is as follows: About 40 parts by weight of distilled lamp petroleum are first of all intimately mixed with about 6 parts by weight of tar, preferably wood tar. To this mixture are added advantageously in the form of drops about 10 parts by weight of nitric acid, while constantly agitating and cooling the mixture. This results in an intense action of the nitric acid with the generation of vapors of a yellow to a reddish brown color. After a few hours two orange colored or reddish yellow oils are obtained by filtering which have different specific weights and different color intensity and form separate layers, while a solid resinous nitro product remains on the filter in the form of a deep or black-brown mass. In this way there are obtained firstly two liquid oily products, and secondly a solid resinous product. The oily nitro products obtained allow of being mixed with all oils as well as with glycerin and after being shaken for some time with water, preferably with an addition of absolute alcohol, give a white fairly stable emulsion. This emulsion may be employed for impregnating building materials such as lime and cement mortar and rendering them water proof, so that they are insulated against moisture and are at the same time preserved and protected against wall fungus. The resinous nitro products are for the most part soluble in water, have a smaller specific weight than tar and may be melted together so as to form an asphalt-like mass. They may be vulcanized, that is to say, in being treated with sulfur dissolved in carbonic disulfid they assume a considerable solidity and an appearance of caoutchouc-like nature. They may also be ground up finely and mixed with cement, lime or chalk. In this mixture the tar nitrate powder will spread into the pores of the mortar, when, under the influence of the alkali earths, an increase in volume will take place, that serves to entirely close up the pores. The mortar thus protects the masonry against rising moisture and against the passage of water, so that it becomes insulated accordingly.

The importance of this invention resides more particularly in the fact that it enables the known preserving and insulating properties of the petroleum and of the tar to be utilized, whereas hitherto this was impossible with the products not preliminarily treated owing to the smell and the color as well as owing to their incapability of mixing with other oils and fats.

What I claim is:—

1. A process for the manufacture of nitro products from a mixture of petroleum and tar with the aid of nitric acid consisting in subjecting petroleum in the presence of tar to the action of concentrated nitric acid and cooling.

2. A process for the manufacture of nitro products which consists in mixing about 40 parts by weight of distilled lamp petroleum with about 6 parts of tar, adding in drops about 10 parts of nitric acid under constant stirring and cooling, and separating the resulting nitro products by filtration.

In witness whereof I have hereunto set my hand in presence of two witnesses.

ALBERT S. FLEXER.

Witnesses:
  JOSEF SCHMEIDEL,
  AUGUST FUGGER.